United States Patent
Tapie et al.

(10) Patent No.: US 9,822,707 B2
(45) Date of Patent: Nov. 21, 2017

(54) VENT SYSTEM FOR USE IN A GAS TURBINE AND METHOD OF OPERATING THEREOF

(71) Applicant: General Electric Company, Schenectady, NY (US)

(72) Inventors: Yann Tapie, Belfort (FR); Cedric Vasselon, Nay (FR); Olivier Schweiger, Illfurth (FR); Olivier Chapuis, Belfort (FR)

(73) Assignee: General Electric Company, Schenectady, NY (US)

( * ) Notice: Subject to any disclaimer, the term of this patent is extended or adjusted under 35 U.S.C. 154(b) by 512 days.

(21) Appl. No.: 14/383,442

(22) PCT Filed: Dec. 18, 2012

(86) PCT No.: PCT/EP2012/075916
§ 371 (c)(1),
(2) Date: Dec. 22, 2014

(87) PCT Pub. No.: WO2013/092563
PCT Pub. Date: Jun. 27, 2013

(65) Prior Publication Data
US 2015/0107217 A1    Apr. 23, 2015

(30) Foreign Application Priority Data
Dec. 21, 2011   (FR) ...................... 11 62219

(51) Int. Cl.
*F02C 1/00*    (2006.01)
*F02C 7/232*   (2006.01)
(Continued)

(52) U.S. Cl.
CPC .............. *F02C 7/232* (2013.01); *F02C 3/22* (2013.01); *F02C 9/28* (2013.01); *F02C 9/40* (2013.01);
(Continued)

(58) Field of Classification Search
CPC .... F02C 7/22; F02C 7/232; F02C 9/28; F02C 9/34; F02C 9/46; F02C 9/263
See application file for complete search history.

(56) References Cited

U.S. PATENT DOCUMENTS 3,558,249 A * 1/1971 Cope ...................... F23D 14/82
431/12
6,082,095 A * 7/2000 Akimaru ................... F02C 3/22
60/39.465
(Continued)

FOREIGN PATENT DOCUMENTS

EP        1798385 A1   6/2007
WO    2005043029 A1   5/2005

*Primary Examiner* — Pascal M Bui Pho
*Assistant Examiner* — Kyle Thomas
(74) *Attorney, Agent, or Firm* — Armstrong Teasdale LLP

(57) ABSTRACT

A vent for use in a gaseous fuel supply circuit of a gas turbine is provided. The vent includes an inlet in flow communication with the gaseous fuel supply circuit, a first outlet in flow communication with the gaseous fuel supply circuit and configured to release gaseous fuel at atmospheric pressure, a first valve coupled between the inlet and the first outlet, wherein the first valve includes a second outlet configured to channel the gaseous fuel towards a combustion device. The system also includes a second valve coupled between the inlet and the second outlet, and a control device configured to selectively open and close the first and second valves based on a pressure of the gaseous fuel.

20 Claims, 2 Drawing Sheets

(51) Int. Cl.
*F02C 3/22* (2006.01)
*F02C 9/28* (2006.01)
*F02C 9/40* (2006.01)
*F23K 5/00* (2006.01)
*F23N 5/24* (2006.01)

(52) U.S. Cl.
CPC ............... *F23K 5/002* (2013.01); *F23N 5/24* (2013.01); *F23K 2401/201* (2013.01); *F23K 2900/05001* (2013.01); *F23N 2021/10* (2013.01)

(56) References Cited

U.S. PATENT DOCUMENTS

| | | | |
|---|---|---|---|
| 2001/0022080 A1* | 9/2001 | Tanaka | F02C 3/22 60/39.465 |
| 2007/0266632 A1* | 11/2007 | Tsangaris et al. | C10J 3/18 48/190 |
| 2008/0115483 A1 | 5/2008 | Moore et al. | |
| 2009/0025396 A1* | 1/2009 | Joshi | F02C 7/22 60/773 |

* cited by examiner

VENT SYSTEM FOR USE IN A GAS TURBINE AND METHOD OF OPERATING THEREOF

CROSS REFERENCE TO RELATED APPLICATIONS

This application is a U.S. National Phase patent application of International Application Serial No. PCT/EP2012/075916, filed on Dec. 18, 2012, the disclosure of which is incorporated by reference in its entirety, and which claims priority to French Patent Application No. 1162219, filed on Dec. 21, 2011, the disclosure of which is incorporated herein by reference in its entirety.

BACKGROUND

The field of the disclosure relates generally to gas turbines and, more particularly, to evacuation devices, or vents for gaseous fuel powering the gas turbines.

At least some known gas turbines are powered by a gaseous fuel routed through a supply circuit. The gaseous fuel supply circuit generally used to regulate a flow and a pressure of gaseous fuel that powers the gas turbine and used to ensure rapid security of the circuit. To achieve such rapid security, the supply circuit comprises several valves fitted in series on fuel routing pipes of the gaseous fuel supply circuit.

In cases where emergency shutdown of the system is required, such as a case of detection of gas leakage or excess speed of the gas turbine, the gaseous fuel supply circuit must be drained within a very short period, preferably within 30 seconds, to obtain a residual pressure in the closed circuit substantially equal to the atmospheric pressure. The residual gaseous fuel in the supply circuit is then released to the atmosphere.

Furthermore, during turbine startup, it is also necessary to supply the turbine with a gaseous fuel having a temperature greater than a determined value to obtain the conditions required in the combustion chamber to be able to start the turbine. For this purpose, the supply circuit comprises one or more heating devices capable of gradually increasing the gaseous fuel temperature while being routed towards the combustion chamber. However, if the gaseous fuel has not reached the desired temperature, it cannot power the combustion chamber, and is generally released to the atmosphere.

However, the discharge of gaseous fuel to the atmosphere has several disadvantages such as from an environmental point of view (i.e., toxicity of gaseous fuel), and from a security point of view. The volume of gaseous fuel released to the atmosphere may be difficult to disperse due to the large volume released, a density of gaseous fuel, or topography of the site where the gaseous fuel is released.

JP document 08200650 discloses a gaseous fuel routing device comprising one vent that releases the gaseous fuel.

BRIEF DESCRIPTION

In one aspect, a vent system for use in a gaseous fuel supply circuit of a gas turbine is provided. The system includes an inlet in flow communication with the gaseous fuel supply circuit, a first outlet in flow communication with the gaseous fuel supply circuit and configured to release gaseous fuel at atmospheric pressure, a first valve coupled between the inlet and the first outlet, wherein the first valve includes a second outlet configured to channel the gaseous fuel towards a combustion device. The vent also includes a second valve coupled between the inlet and the second outlet, and a control device configured to selectively open and close the first and second valves based on a pressure of the gaseous fuel.

In another aspect, a gas turbine is provided. The gas turbine includes a combustor and a gaseous fuel supply circuit coupled upstream from the combustor that includes a vent. The vent includes an inlet in flow communication with the gaseous fuel supply circuit, a first outlet in flow communication with the gaseous fuel supply circuit and configured to release gaseous fuel at atmospheric pressure, a first valve coupled between the inlet and the first outlet, wherein the first valve includes a second outlet configured to channel the gaseous fuel towards a combustion device. The vent also includes a second valve coupled between the inlet and the second outlet, and a control device configured to selectively open and close the first and second valves based on a pressure of the gaseous fuel.

In yet another aspect, a method of operating a gas turbine is provided. The method includes selectively channeling a flow of gaseous fuel towards a first valve and a first outlet, the first valve including a second outlet towards a combustion device the first outlet towards an atmospheric environment, coupling a second valve upstream from the first valve, and selectively opening and closing the first and second valves based on a pressure of the gaseous fuel.

DETAILED DESCRIPTION

Figure 1:
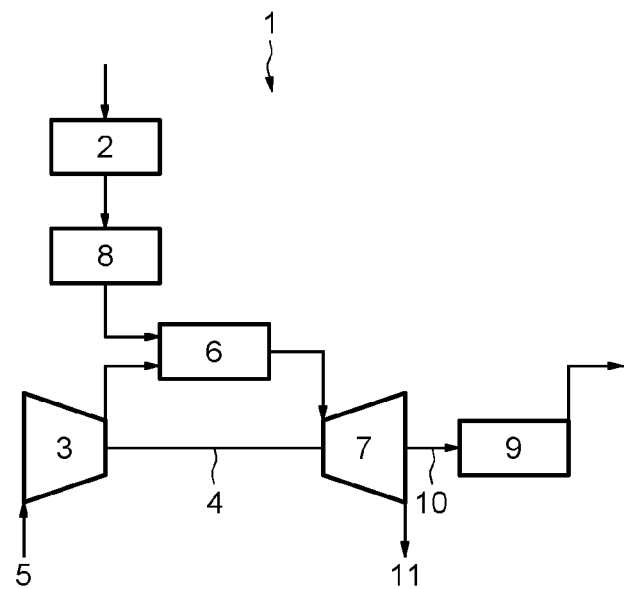
FIG. 1 is a schematic diagram of an exemplary gas turbine.

Embodiments of the present disclosure resolve the problems described above. In particular, embodiments of the present disclosure include a vent, or gaseous fuel evacuation device, which facilitates limiting the discharge of gaseous fuel to the atmosphere, particularly at the time of emergency shutdown or gas turbine startup. Embodiments of the present disclosure also preserve the security conditions required, such as a depressurization period of the supply circuit, a maximum residual vacuum pressure in the supply circuit, and/or reliability.

The embodiments described herein include a vent for the gaseous fuel supply circuit of a gas turbine. The vent includes an inlet to be connected to the gaseous fuel supply circuit, a first outlet capable of releasing the gaseous fuel at atmospheric pressure, and a first valve coupled between the inlet and the first outlet. The vent also comprises a second outlet capable of providing gaseous fuel through combustion at atmospheric pressure, such as a flare, a second valve coupled between the inlet and the second outlet, and a control device capable of controlling the opening and closing of the first and second valves based on the pressure of gaseous fuel.

In the exemplary embodiment, the vent provides an independent combustion device of the gas turbine, and facilitates burning gaseous fuel before being released to the atmosphere. The combustion device, for example a flare, also facilitates releasing the residual gaseous fuel present in the gaseous fuel supply circuit, and obtaining a residual pressure substantially equal to the atmospheric pressure as the combustion takes place at a pressure that is almost identical or substantially equal to the atmospheric pressure. Finally, the combustion device can be easily sized to obtain the combustion of a given flow of gaseous fuel, thus facilitating the limited period of purge of the supply circuit.

Furthermore, the vent also facilitates limiting the risks of combustion of gaseous fuel in the supply circuit by providing an outlet towards the atmosphere when the gaseous fuel pressure is less than a determined value. In particular, according to one aspect of the present disclosure, the vent facilitates limiting transfer between the outlet towards the combustion device and the outlet towards the atmosphere. Thus, it is possible to maintain the circuit in a stable and safe state, by maintaining pressure in the supply circuit at a level substantially equal to that of the atmospheric pressure. Furthermore, the vent facilitates limiting the discharge of gaseous fuel to the atmosphere by opening the outlet towards the atmosphere only at the end of each drain stage of the supply circuit when the gaseous fuel pressure is almost identical to the atmospheric pressure.

In one embodiment, the vent also comprises a third valve coupled between the inlet and the second outlet and the control device is capable of controlling the opening and closing of the third valve based on the temperature of the gaseous fuel in the supply circuit. The third valve may be used specifically for the start phases when it is then controlled by the temperature of gaseous fuel, and it closes when the temperature of gaseous fuel reaches a desired value. In this case, no gaseous fuel is released to the atmosphere in the start phase of the gas turbine.

Also, according to another aspect, embodiments of the present disclosure include a supply circuit for a gas turbine comprising a vent such as described before.

The supply circuit may also have a gaseous fuel pressure measurement device, and the control device may receive measurements from the pressure measurement device.

The supply circuit may also comprise an insulation valve and a regulation valve coupled downstream from the insulation valve, and the vent inlet may be coupled between the insulation valve and the regulation valve. During depressurization of a supply circuit, a quantity of gas is present between the insulation valve and the regulation valve. As such, the vent is coupled between these two valves to facilitate burning a quantity of gaseous fuel in the combustion device.

The supply circuit may also comprise a gas control valve coupled downstream of the regulation valve and a vent to the atmosphere coupled between the regulation valve and the gas control valve. In the portion of the supply circuit located between the regulation valve and the gas control valve, the quantity of gaseous fuel present therein is relatively limited, such that a vent direct to the atmosphere is possible.

Embodiments of the present disclosure also relate to a gas turbine comprising a supply circuit as described before.

In another aspect, embodiments of the present disclosure relate to a gaseous fuel evacuation process present in a gaseous fuel supply circuit of a gas turbine, in which the gaseous fuel to be evacuated is routed towards a combustion device at atmospheric pressure, for example a flare, when the pressure of the gaseous fuel is greater than a determined pressure, for example, the flare usage pressure, and the gaseous fuel to be evacuated is routed towards the atmosphere until a pressure substantially equal to the atmospheric pressure is obtained in the gaseous fuel supply circuit.

In one embodiment, the gaseous fuel present in the supply circuit is evacuated towards the flare when the gas turbine is shutdown urgently or when the gas turbine is in startup mode and the gaseous fuel temperature is less than a fixed temperature.

In one embodiment, the gas turbine comprises an insulation valve and a regulation valve coupled downstream of the insulation valve, and the gaseous fuel evacuated when the gas turbine is shutdown urgently is the gaseous fuel contained between the insulation valve and the regulation valve.

Other advantages and features of the present disclosure will appear on examination of the detailed description of a mode of execution of the present disclosure which is not limited.

FIG. 1 is a schematic diagram of an exemplary gas turbine 1 powered with gaseous fuel from, for example, a tank 2. Gas turbine 1 is generally used in electric power plants to drive the generators and to produce electric energy. Gas turbine 1 comprises an axial compressor 3 with one rotor shaft 4. Air is channeled towards inlet 5 of axial compressor 3, is compressed by axial compressor 3, and is then routed towards a combustion chamber 6. Combustion chamber 6 is also powered by a gaseous fuel, for example natural gas which, during combustion, produces hot gases with high energy capable of driving a turbine 7. The gaseous fuel may be routed from tank 2 to combustion chamber 6 through a gaseous fuel supply circuit 8 which comprises an inlet (not shown) connected to tank 2 and an outlet (not shown) connected to combustion chamber 6.

In turbine 7, the energy from the hot gases is converted during operation and at least a portion of the hot gas is used to drive compressor 3, via rotor shaft 4, and at least a portion of the hot gas is used to drive an electricity production generator 9 through a shaft 10. Exhaust gases are discharged from turbine 7 through an outlet 11, and may be used for other applications.

Figure 2:
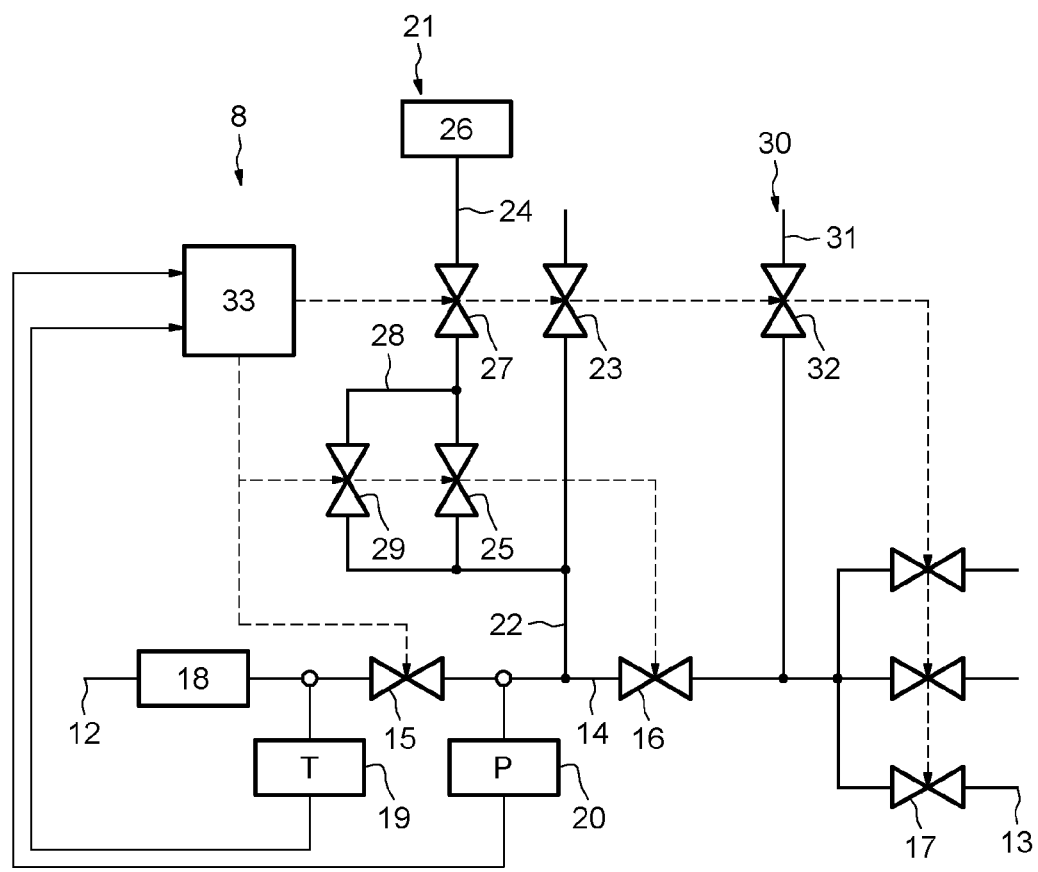
FIG. 2 is a schematic diagram of an exemplary gaseous fuel supply circuit.

FIG. 2 is a schematic diagram of an exemplary gaseous fuel supply circuit 8 of combustion chamber 6. Supply circuit 8 comprises an inlet 12 to receive the gaseous fuel, and outlets 13 to provide combustion chamber 6 with gaseous fuel, and a routing line 14 connecting inlet 12 with outlets 13.

Gaseous fuel routing line 14 successively comprises, in the direction of circulation of gaseous fuel, an insulation valve 15 (i.e., a Safety Shut-Off valve) connected to inlet 12, a regulation valve 16 (i.e., a Stop Ratio Valve) coupled downstream of insulation valve 15, and supply lines (not shown), for example three, coupled in parallel downstream of regulation valve 16 and each one comprising a gas control valve 17 (i.e., a Gas Control Valve) coupled upstream of an outlet 13 towards combustion chamber 6.

Insulation valve 15 is a safety valve that insulates gaseous fuel supply circuit 8 from the supply circuit of combustion chamber 6. As such, valve 15 facilitates interrupting the gaseous fuel supply if a gas turbine operation problem occurs, or in case it is shutdown.

Regulation valve 16 also facilitates interrupting the gaseous fuel supply of combustion chamber 6, but particularly facilitates controlling the gaseous fuel pressure in routing line 14, between regulation valve 16 and control valves 17, which varies based on a current speed of gas turbine 1.

Control valves 17 determine the quantity of gaseous fuel delivered by supply line 13 in combustion chamber 6. In particular, valves 17 may be a sonic-type valve.

Routing line 14 may also comprise, upstream of insulation valve 15, a heating device 18 capable of increasing the temperature of gaseous fuel before it powers combustion chamber 6.

Routing line 14 also includes a temperature sensor 19 and a pressure sensor 20. Temperature sensor 19 is coupled downstream of heating device 18 between the heating device 18 and insulation valve 15, and facilitates monitoring the temperature of gaseous fuel powering combustion chamber 6. Pressure sensor 20 is coupled between insulation valve 15 and regulation valve 16 and facilitates monitoring the pressure of gaseous fuel in supply circuit 8 during operation of gas turbine 1 or during emergency shutdown.

In the exemplary embodiment, a vent 21 is coupled on the routing line 14. More specifically, vent 21 has a main pipe 22 tapped on routing line 14 between insulation valve 15 and regulation valve 16. A first vent valve 23 is coupled to main pipe 22, which facilitates releasing the gaseous fuel present in routing line 14 between the insulation valve 15 and the regulation valve 16 to the atmosphere.

Vent 21 also has a secondary pipe 24, tapped on main line 22, between the tap on routing line 14 and first vent valve 23. Secondary pipe 24 has a second vent valve 25 towards a combustion device 26, for example a flare, an insulation valve 27 of the vent towards the flare, a parallel pipe 28, and a third vent valve 29 towards combustion device 26.

Second vent valve 25, insulation valve 27, and combustion device 26 are coupled in series on secondary pipe 24 between the tap on main pipe 22 and the discharge to the atmosphere. Third vent valve 29 is coupled on parallel pipe 28, and parallel pipe 28 is fitted on secondary pipe 24 in parallel to second vent valve 25. An inlet (not shown) of parallel pipe 28 is tapped on secondary pipe 24 upstream of second vent valve 25 and an outlet (not shown) of parallel pipe 28 is tapped on secondary pipe 24 downstream of second vent valve 25, but upstream of insulation valve 27.

Combustion device 26 facilitates burning the gaseous fuel before discharging it to the atmosphere. Insulation valve 27 facilitates closing secondary pipe 24 and thus insulating combustion device 26 of routing line 14, either through secondary pipe 24 or through parallel pipe 28. Second vent valve 25 facilitates controlling the gaseous fuel flow circulating from routing line 14 towards combustion device 26.

In one embodiment, first vent valve 23 is a valve open by default with an opening diameter of about 3 inches, second vent valve 25 is a valve closed by default with an opening diameter of about 3 inches, and third vent valve 29 is a valve closed by default with an opening diameter of about 1 inch. In the exemplary embodiment, third vent valve 29 is used in the start phases, while second vent valve 25, which has a wider opening and thus a greater flow, is used in the emergency shutdown phases when the gaseous fuel present in routing line 14 must be rapidly vented.

Furthermore, supply circuit 8 may also have a secondary vent 30 to the atmosphere. More particularly, secondary vent 30 has a main pipe 31 tapped on routing line 14 between regulation valve 16 and control valves 17. A fourth vent valve 32 to the atmosphere is coupled on main pipe 21 and is between regulation valve 16 and control valves 17. Fourth vent valve 32 facilitates releasing the gaseous fuel present in routing line 14. In particular, when the quantity of residual gaseous fuel between regulation valve 16 and control valves 17 is less than the quantity of residual gaseous fuel between insulation valve 15 and regulation valve 16, supply circuit 8 has only a single vent 21 to combustion device 26, between insulation valve 15 and regulation valve 16.

Vents 21 and 30 facilitate evacuating the gaseous fuel found in routing line 14 between insulation valve 15 and control valves 17.

In the exemplary embodiment, supply circuit 8 has a control device 33. Control device 33 that receives the information provided by the pressure and temperature sensors 19 and 20, and is capable of controlling the different valves of supply circuit 8 based on the mode of operation of gas turbine 1.

Thus, when gas turbine 1 is in a normal shutdown phase, valves 16, 17, 23, 25, 27 and 29 are closed, and valves 15 and 32 are opened. Valves 23, 25, 27 and 29 remain closed to facilitate limiting depressurization of gaseous fuel routing line 14.

In the start phases, the gaseous fuel is heated before entering combustion chamber 6. Insulation valve 15 is opened and heating device 18 is used. Temperature sensor 19 indicates to control device 33 if the determined temperature is reached. When the temperature of the gaseous fuel is less than the required temperature, valves 16 and 17 are closed and the gaseous fuel is vented. Valves 29 and 27 are opened to vent the gaseous fuel between valves 15 and 16 towards combustion device 26, and valve 32 is opened to vent the gaseous fuel between valve 16 and valves 17 to the atmosphere. Valves 23 and 25 remain closed.

When the gaseous fuel reaches the desired temperature, gas turbine 1 starts operating and valves 15, 16 and 17 are opened, while valves 23, 25, 27, 29 and 32 are closed. As such, there is no venting and the gaseous fuel is channeled towards combustion chamber 6.

In case of emergency shutdown of gas turbine 1, valves 15, 16 and 17 of routing line 14 are all closed, and the residual gaseous fuel in routing line 14 is vented. As such, valve 32 is opened to vent the gaseous fuel remaining between valve 16 and valves 17 towards the atmosphere. Furthermore, the gaseous fuel between valve 15 and valve 16 is firstly vented towards combustion device 26. More specifically, valves 25 and 27 are opened to facilitate rapid evacuation of the gaseous fuel towards combustion device 26. Valves 23 and 29 remain closed during this period.

When the pressure of the residual gaseous fuel remaining between valves 15 and 16, and measured by sensor 20, is less than a determined value, for example the supply pressure of combustion device 26, valves 25 and 27 are closed and valve 23 is opened to finish venting the remaining residual gaseous fuel towards the atmosphere. In particular, valve 23 is opened only after closure of valves 25 and/or 27.

Figure 3:
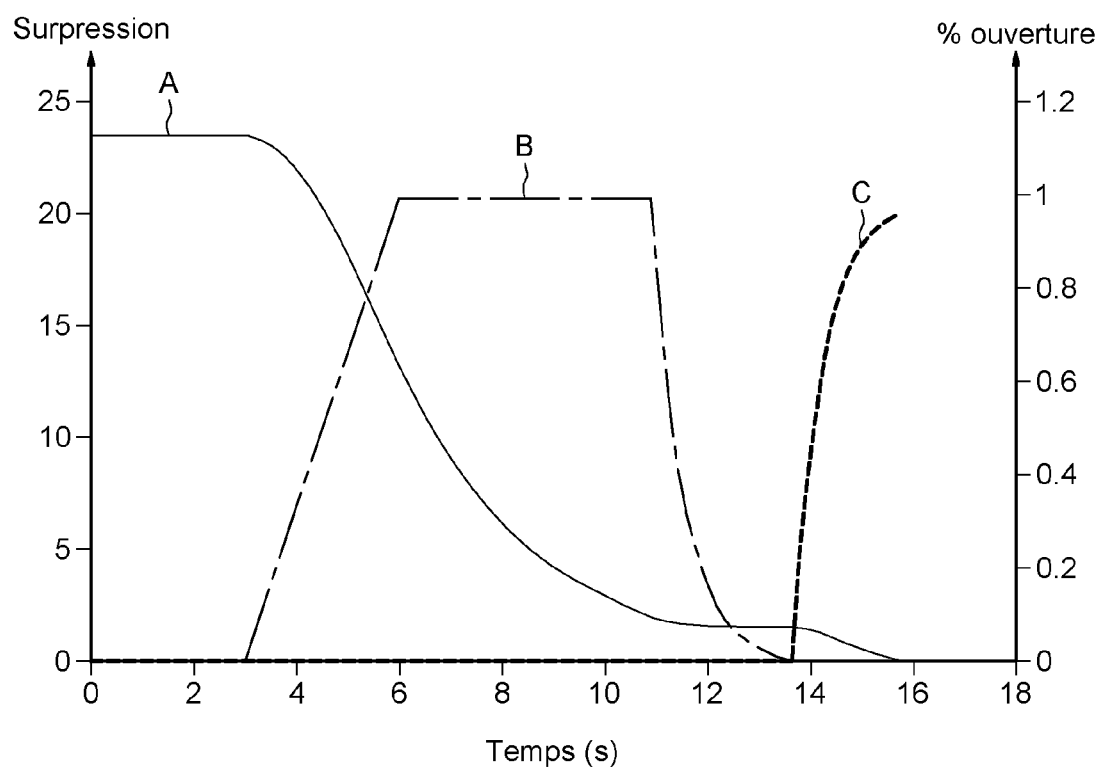
FIG. 3 is a graph of an exemplary vent control model in an emergency shutdown phase.

FIG. 3 is a graph of an exemplary vent control model in an emergency shutdown phase, such as for valves 25 and 23 (i.e., curves (B) and (C), respectively). FIG. 3 also shows a variation in pressure of the gaseous fuel measured by device 20 in supply circuit 8 (curve (A)). Thus, the model has a first part during which safety valve 15 is closed, and a second part in which the remaining gaseous fuel is vented in supply circuit 8. For this, second valve 25 is gradually opened until it is completely open such that the gaseous fuel remaining in the supply circuit 8 is fed to combustion device 26. As such, a rapid drop is observed in the pressure of the gaseous fuel which is burnt in combustion device 26.

When the pressure of the gaseous fuel in supply circuit 8 falls below a determined value, second valve 25 is gradually closed to facilitate reducing transfer between combustion device 26 and supply circuit 8. When second valve 25 is completely closed, first valve 23 may then be gradually opened to ensure routing line 14 is at atmospheric pressure, and to discharge the residual gaseous fuel to the atmosphere. Thus, a pressure equal to the atmospheric pressure is obtained in supply circuit 8.

Thus, the embodiments described herein vent the gaseous fuel contained in the supply circuit by increasing the quantity of gaseous fuel released towards a combustion device while reducing the vent period. Furthermore, control of the vent valves based on the pressure in the supply circuit and according to the opening status of other vent valves facilitates safely operating the vent phase.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A vent system for use in a gaseous fuel supply circuit of a gas turbine, the gaseous fuel supply circuit including a fuel routing line extending between an insulation valve and a regulation valve coupled downstream from the insulation valve, said system comprising:
    a main pipe tapped from the fuel routing line;
    a first outlet in downstream flow communication with said main pipe and configured to release gaseous fuel from said main pipe at atmospheric pressure;
    a first valve coupled in upstream flow communication with said first outlet;
    a second outlet in downstream flow communication with said main pipe and configured to channel the gaseous fuel from said main pipe towards a combustion device;
    a second valve coupled in upstream flow communication with said second outlet;
    a pressure sensor coupled to the fuel routing line and operable to measure a gaseous fuel pressure therein; and
    a control device coupled to said pressure sensor, said first valve, and said second valve, said control device configured in an emergency shutdown phase of the gas turbine to:
    open said second valve and close said first valve in response to the measured pressure being above a predetermined value, such that the gaseous fuel in the fuel routing line is routed through said main pipe and through said second outlet; and
    close said second valve and open said first valve in response to the measured pressure being below the predetermined value, such that the gaseous fuel in the fuel routing line is routed through said main pipe and through said first outlet.

2. The system in accordance with claim 1 further comprising a third valve coupled in upstream flow communication with said second outlet and in parallel flow communication with said second valve, wherein said control device is further configured in a start-up phase of the gas turbine to selectively open and close said third valve based on a temperature of the gaseous fuel in the supply circuit.

3. The system in accordance with claim 2 further comprising a temperature measurement device configured to measure the temperature of the gaseous fuel, wherein said control device is configured to receive a temperature measurement from said temperature measurement device.

4. The system in accordance with claim 1, wherein the predetermined value corresponds to a supply pressure for operation of said combustion device.

5. The system in accordance with claim 1 wherein the controller is further configured to close the insulation valve and the regulation valve in the emergency shutdown phase of the gas turbine.

6. The system in accordance with claim 5 further comprising a fourth valve coupled downstream from the regulation valve, wherein said fourth valve is configured to release residual gaseous fuel at atmospheric pressure when said regulation valve is closed.

7. The system in accordance with claim 1 further comprising a gas control valve coupled downstream from said regulation valve.

8. A gas turbine comprising:
    a combustor; and
    a gaseous fuel supply circuit coupled upstream from said combustor, said gaseous fuel supply circuit comprising:
    an insulation valve;
    a regulation valve coupled downstream from said insulation valve;
    a fuel routing line extending between said insulation valve and said regulation valve;
    a main pipe tapped from said fuel routing line;
    a first outlet in downstream flow communication with said main pipe and configured to release gaseous fuel from said main pipe at atmospheric pressure;
    a first valve coupled in upstream flow communication with said first outlet;
    a second outlet in downstream flow communication with said main pipe and configured to channel the gaseous fuel from said main pipe towards a combustion device;
    a second valve coupled in upstream flow communication with said second outlet;
    a pressure sensor coupled to said fuel routing line and operable to measure a gaseous fuel pressure therein; and
    a control device coupled to said pressure sensor, said first valve, and said second valve, said control device configured in an emergency shutdown phase of said gas turbine to:
    open said second valve and close said first valve in response to the measured pressure being above a predetermined value, such that the gaseous fuel in said fuel routing line is routed through said main pipe and through said second outlet; and
    close said second valve and open said first valve in response to the measured pressure being below the predetermined value, such that the gaseous fuel in said fuel routing line is routed through said main pipe and through said first outlet.

9. The gas turbine in accordance with claim 8 further comprising a third valve coupled in upstream flow communication with said second outlet and in parallel flow communication with said second valve, wherein said control device is further configured in a start-up phase of said gas turbine to selectively open and close said third valve based on a temperature of the gaseous fuel in said supply circuit.

10. The gas turbine in accordance with claim 9 further comprising a temperature measurement device configured to measure the temperature of the gaseous fuel, wherein said control device is configured to receive a temperature measurement from said temperature measurement device.

11. The gas turbine in accordance with claim 8, wherein the predetermined value corresponds to a supply pressure for operation of said combustion device.

12. The gas turbine in accordance with claim 8 wherein the controller is further configured to close said insulation valve and said regulation valve in the emergency shutdown phase of said gas turbine.

13. The gas turbine in accordance with claim 12 further comprising a fourth valve coupled downstream from said regulation valve, wherein said fourth valve is configured to release residual gaseous fuel at atmospheric pressure when said regulation valve is closed.

14. The gas turbine in accordance with claim 8 further comprising a gas control valve coupled downstream from said regulation valve.

15. A method of operating a gas turbine, the gas turbine including a gaseous fuel supply circuit that includes a fuel routing line extending between an insulation valve and a regulation valve coupled downstream from the insulation valve, said method comprising:
  selectively channeling a flow of gaseous fuel from the fuel routing line into a main pipe tapped from the fuel routing line, wherein a first outlet in downstream flow communication with the main pipe is configured to release the gaseous fuel from the main pipe at atmospheric pressure, a first valve is coupled in upstream flow communication with the first outlet, a second outlet in downstream flow communication with the main pipe is configured to channel the gaseous fuel from the main pipe towards a combustion device, and a second valve is coupled in upstream flow communication with the second outlet;
  measuring a pressure of the flow of gaseous fuel;
  opening the second valve and closing the first valve in response to the gas turbine being in an emergency shutdown phase and the measured pressure being above a predetermined value, such that the gaseous fuel in the fuel routing line is routed through the main pipe and through the second outlet; and
  closing the second valve and opening the first valve in response to the gas turbine being in the emergency shutdown phase and the measured pressure being below the predetermined value, such that the gaseous fuel in the fuel routing line is routed through the main pipe and through the first outlet.

16. The method in accordance with claim 15, further comprising:
  selectively opening and closing a third valve in response to the gas turbine being in a start-up phase and based on a temperature of the gaseous fuel, the third valve coupled in upstream flow communication with the second outlet and in parallel flow communication with the second valve.

17. The method in accordance with claim 16, wherein selectively opening and closing the third valve comprises measuring the temperature of the gaseous fuel with a temperature measurement device.

18. The method in accordance with claim 15, wherein opening the second valve and closing the first valve in response to the measured pressure being above the predetermined value comprises opening the second valve and closing the first valve in response to the measured pressure being above a supply pressure for operation of the combustion device.

19. The method in accordance with claim 15, further comprising closing the insulation valve and the regulation valve in the emergency shutdown phase of the gas turbine.

20. The method in accordance with claim 19, further comprising selectively opening and closing a fourth valve, the fourth valve coupled downstream from the regulation valve and configured to release residual gaseous fuel at atmospheric pressure when the regulation valve is closed.

* * * * *